United States Patent Office 3,639,336
Patented Feb. 1, 1972

3,639,336
HEXAHYDRO-1,3,5-TRIS-(4-HYDROXYARYL)-s-
TRIAZINES
Warren L. Beears, Brecksville, Ohio, assignor to The
B. F. Goodrich Company, New York, N.Y.
No Drawing. Original application Oct. 31, 1968, Ser. No.
772,363, now Patent No. 3,567,724, dated Mar. 2,
1971. Divided and this application Mar. 18, 1970, Ser.
No. 14,860
Int. Cl. C08f 45/60; C08g 51/60; C10m 1/36
U.S. Cl. 260—45.8 N                                        13 Claims

ABSTRACT OF THE DISCLOSURE

Novel hexahydro-1,3,5-tris-(4-hydroxyaryl)-s-triazines have been prepared. These compounds are effective stabilizers for organic materials, such as α-olefin polymers and copolymers, acetal polymers, polyamides, polyesters and polyurethanes, against the deleterious effects of oxygen, heat and light.

This is a division of application Ser. No. 772,363 filed Oct. 31, 1968, now U.S. Pat. No. 3,567,724.

BACKGROUND OF THE INVENTION

The ability of the hindered phenolic compounds to stabilize materials against oxidative degradation is widely recognized. More recently, the trend has been to prepare compounds containing a plurality of hindered phenolic moieties attached through some common nucleus. Using this technique, high molecular weight compounds which are effective as stabilizers can be obtained. Such compounds are appreciably less volatile, due to their increased molecular weight, than if the individual phenolic moiety were employed.

SUMMARY OF THE INVENTION

I have now prepared novel hexahydro - 1,3,5 - tris-(4-hydroxyaryl)s-triazine compounds having a hydroxyl group hindered by two alkyl radicals immediately adjacent to it in the 3 and 5 ring positions. The present compounds consist of a symmetrical hexahydro-1,3,5-triazine nucleus containing three hindered phenolic moieties attached through carbonyl linkages. The hexahydro-1,3,5-tris-(4-hydroxyaryl)-s-triazines are effective stabilizers for organic materials which are subject to oxidative, thermal or photochemical degradation. They possess low volatility, are nonstaining, and are extremely effective protective agents for organic polymeric materials, both natural and synthetic. The compounds of this invention are especially useful as stabilizers for α-monoolefin homopolymers and copolymers particularly polyethylene, polypropylene and ethylene-propylene copolymers and terpolymer, polyacetal homopolymers and copolymers, polyamides, polyesters and polyurethanes.

DETAILED DESCRIPTION

The compounds of the present invention are represented by the structural formula

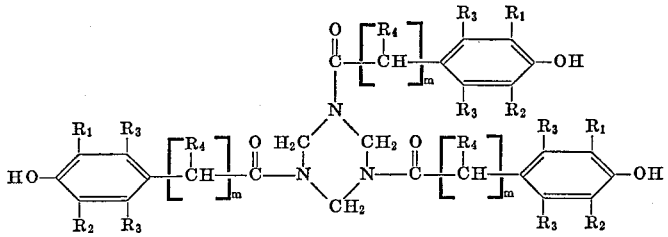

wherein $R_1$ and $R_2$ are tertiary alkyl groups containing from 4 to 18 carbon atoms, $R_3$ is hydrogen or alkyl groups containing from 1 to 18 carbon atoms, $R_4$ is hydrogen or an alkyl group containing from 1 to 4 carbon atoms, and $m$ is an integer from 2 to 5.

Preferred compounds of the present invention will have the formula

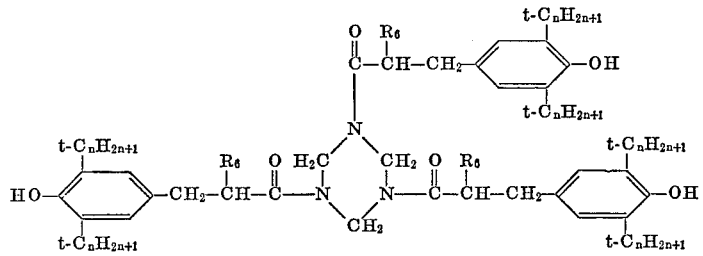

wherein $R_6$ is hydrogen or a methyl group and $n$ is an integer between 4 to 12. These compounds are excellent stabilizers for organic materials which are subject to oxidative, thermal and photochemical degradation. It is notable with the hexahydro-1,3,5-tris-(4-hydroxyaryl)-s-triazines of the present invention that although they are high molecular weight materials, the weight ratio of the phenol to the total weight of the molecule remains high. Accordingly, effective stabilization of organic materials with low levels of the hexahydro-1,3,5-tris-(4-hydroxyaryl)-s-triazines is possible. This results in a significant economic advantage to the user. The present compounds are also effective stabilizers for high temperature applications due to their extremely low volatility.

Hexahydro-1,3,5-tris-(4-hydroxyaryl)-s-triazines within the scope of the present invention include:

hexahydro-1,3,5-tris-β-(3,5,-di-t-butyl-4-hydroxyphenyl) propionyl-s-triazine, hexahydro-1,3,5-tris-β-(3,5-di-t-amyl-4-hydroxyphenyl) propionyl-s-triazine, hexahydro-1,3,5-tris-β-(3-t-butyl-5-t-amyl-4-hydroxyphenyl)propionyl-s-triazine, hexahydro-1,3,5-tris-β-[3,5-di(1-methyl-1-ethylpropyl)-4-hydroxyphenyl]propionyl-s-triazine, hexahydro-1,3,5-tris-β-[3,5-di(1,1,2,2-tetramethylpropyl)-4-hydroxyphenyl]propionyl-s-triazine, hexahydro-1,3,5-tris-β-[3,5-di(1,1-dimethylpentyl)-4-hydroxyphenyl]propionyl-s-triazine, hexahydro-1,3,5-tris-β-[3,5-di-(1,1-dimethyldecyl)-4-hydroxyphenyl]propionyl-s-triazine, hexahydro-1,3,5-tris-β-(3,5-di-t-butyl-4-hydroxyphenyl)-α-methylpropionyl-s-triazine, hexahydro-1,3,5-tris-β-(3,5-di-t-amyl-4-hydroxyphenyl)-α-methylpropionyl-s-triazine, hexahydro-1,3,5-tris-β-(3,5-di-t-butyl-4-hydroxyphenyl)-butenyl-s-triazine, hexahydro-1,3,5-tris-γ-(3,5-di-t-butyl-4-hydroxyphenyl) butenyl-s-triazine and the like.

It is not necessary that the phenolic substituents on the hexahydro-s-triazine ring be identical. Unsymmetrical hexahydro-s-triazines, that is, substituted with dissimilar hindered phenolic substituents, may be prepared and are within the scope of the present invention.

The novel hexahydro - 1,3,5-tris-(4-hydroxyaryl)-s-triazines are high melting crystalline solids soluble in acetone, methylethyl ketone, diethyl ether, dioxane, tetrahydrofuran, chloroform and aromatic hydrocarbons such as benzene and toluene. They are slightly soluble in aliphatic hydrocarbons and alcohols such as methanol and ethanol. Recrystallization of these compounds is best achieved from hot chloroform or a mixture of hot chloroform and hexane. Generally, the compounds will range in color from white to a very pale yellow when pure. The presence of solvent residues or other impurities will generally cause yellowing of the compounds upon standing, especially upon exposure to air.

The hexahydro - 1,3,5 - tris-β-(3,5-di-t-butyl-4-hydroxyphenyl)propionyl-s-triazine is a white crystalline solid existing in three metastable states, an α-crystalline form, a β-crystalline form and a glass. The temperature and recrystallization medium employed generally determine which crystalline form is obtained. The α-crystalline form is obtained upon recrystallization from chloroform solution. The β-form can be obtained upon recrystallizing from boiling toluene. Mixtures of the α- and β-form generally will result if the compounds are precipitated from N,N-dimethylformamide by the addition of water. Both the α- and β-crystalline forms melt at 233° C. to 235° C. Initial melting in the range of 80 to 105° C. will be observed with the α-form, however, this is actually the transition to the β-crystalline form.

The hexahydro - 1,3,5 - tris-(4-hydroxyaryl)-s-triazines are prepared by combining three mols of the appropriate hindered phenol with one mol of a hexthydro-s-triazine of the formula

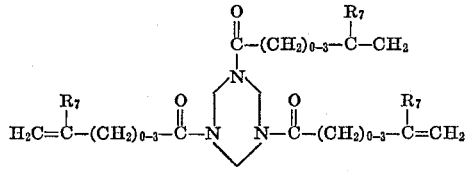

wherein R₇ is hydrogen or an alkyl group containing 1 to 4 carbon atoms. A metal salt of the hindered phenol, formed by the action of a base on the phenol, is reacted with the above-depicted hexahydro-s-triazine compound. The process for preparing the metal salt of the phenol is fully set forth in U.S. Patent 2,974,171. Elevated temperatures (80-150° C.) and inert diluents, such as N,N-dimethylformamide, are generally employed to form the hexahydro-1,3,5-tris-(4-hydroxyaryl)-s-triazines.

The hexahydro-1,3,5-tris-(4-hydroxyaryl)-s-triazines of this invention are extremely useful stabilizers. They are useful in a wide variety of organic materials to prevent oxidative, thermal or photochemical degradation. Their ability to effectively stabilize organic materials is attributed, at least partially, to the ability of the hexahydro-s-triazine ring to be substituted with three hindered phenol groups, thus providing a high molecular weight compound without unduly diluting the hindered hydroxyl grouping.

Organic materials which are stabilized in accordance with the present invention include both natural and synthetic polymers. The hexahydro - 1,3,5 - tris-(4-hydroxyaryl)-s-triazines are advantageously employed for the stabilization of homopolymers of ethylene, propylene, butene-1, isobutylene, pentene-1, hexene-1, 4-methylpentene-1, and the like, or copolymers thereof such as ethylene-propylene copolymer, ethylene-butene-1 copolymer, 4-methyl-1-pentene-hexene-1 copolymer and the like; ethylene-propylene-diene rubbers wherein the diene is 1,4-hexadiene, 2-methyl-1,4-hexadiene, dimethyl-1,4,9-decatrienes, dicyclopentadiene, vinylcyclohexene, vinyl norborene, ethylidene norbornene, methylene norbornene, norboradiene, methyl norbornadiene, methyl tetrahydroindene and the like; polyacetal resins, such as acetal homopolymers derived from the polymerization of formaldehyde or acetal copolymers derived from trioxane; polyesters obtained by the condensation of saturated or unsaturated anhydrides or dibasic acids, such as maleic, furmaric, itaconic or terephathalic an hydrides or fumaric, adipic, azelaic, sebacic or isophthalic acids, with a glycol such as propylene glycol, ethylene glycol, diethylene glycol, neopentyl glycol or trimethyl pentanediol; polyether- or polyester-derived polyurethanes; and polyamides such as polycaprolactam or those obtained by the condensation of hexamethylenediamine with adipic or sebacic acid or the like. The present compounds are also useful stabilizers for natural rubber; halogenated rubber; conjugated diene polymers such as polybutadiene, copolymers of butadiene with styrene, acrylonitrile, acrylic acid, alkyl acrylates or methacrylates, methylvinyl ketone, vinyl pyridine and the like, polyisoprene or polychloroprene; vinyl polymers such as polyvinyl chloride, polyvinyl fluoride, polyvinylidene chloride, polyvinyl acetate, copolymers of vinyl chloride with vinylidene chloride, butadiene, styrene vinyl esters, α,β-olefinically unsaturated acids and esters thereof, α,β-olefinically unsaturated ketones and aldehydes and the like; homopolymers and copolymers of acrylic monomers such as acrylic acid, methacrylic acid, methyl acrylate, methyl methacrylate, ethyl acrylate, 2-ethylhexyl acrylate, acrylamide, methacrylamide, N-methylol acrylamide, acrylonitrile, methacrylonitrile or the like; polycarbonates; epoxy resins such as those obtained by the condensation of epichlorohydrin with bisphenols; epichlorohydrin-ethylene oxide or propylene oxide copolymers; and the like.

In addition to the above-mentioned polymeric organic materials the hexahydro-1,3,5-tris-(4-hydroxyaryl)-s-triazines may also be employed to stabilize organic non-polymeric materials. Such materials include waxes, synthetic- and petroleum-derived lubricating oils and greases; mineral oils such as fat, tallo, lard, codliver oil and sperm oil; vegetable oils such as castor, linseed, peanut, palm, cottonseed or the like; fuel oil; diesel oil; gasoline; and the like.

The hexahydro-1,3,5-tris-(4-hydroxyaryl)-s-triazines are especially useful stabilizers for α-monoolefins, homopolymers and copolymers, polyacetal homopolymers and copolymers, polyamides, polyesters and polyurethanes. High and low density polyethylene, polypropylene, polyisobutylene and poly(4-methyl-1-pentene) have markedly improved resistance of oxidative, thermal and photochemical degradation when stabilizing amounts of the present compounds are incorporated therein. Ethylene-propylene copolymers and ethylene-propylene terpolymers containing less than about 10% by weight of a multiple unsaturated third monomer are also effectively stabilized with the hexahydro - 1,3,5 - tris-(4-hydroxyaryl)-s-triazines. Polymer blends, that is, physical mixtures of two or more α-monoolefin copolymers or homopolymers are also stabilized in accordance with the present invention.

The amount of stabilizer employed will vary with the particular material to be stabilized and also the particular hexahydro-1,3,5-tris-(4-hydroxyaryl)-s-triazine employed. Generally, however, for effective stabilization of most organic materials an amount of the hexahydro-1,3,5-tris - (4 - hydroxyaryl)-s-triazine ranging from about 0.001% to about 10% of weight based on the weight of the organic material will be employed. In most applications the amount of stabilizer employed will vary between about 0.01% and about 5% by weight. With the poly(α-monoolefin) homopolymers and copolymers, about 0.01 to about 1.5% by weight of the hexahydro-1,3,5-tris-(4-hydroxyaryl)-s-triazine based on the weight of the polymer will be employed. Certain of the hexahydro-1,3,5-tris-(4-hydroxyaryl)-s-triazines will be more useful in given applications then others. This is attributable, at least in part, to the compatibility of the particular hexahydro-1,3,5-tris-(4-hydroxyaryl)-s- triazine with the organic material to be stabilized as a result of varying the alkyl substituents and their position on the phenol ring or varying the number of methylene units linking the phenolic moiety to the triazine nucleus.

The compounds of this invention are readily incorporated into most organic materials and generally require no special processing. Conventional methods of incorporation have generally been found to be adequate. For example, the hexahydro-1,3,5-tris-(4 - hydroxyaryl)-s-triazines are incorporated into polymers by mixing on a rubber mill or in a Banbury mixer; or they may be added alone, in a suitable solvent, or masterbatched with other ingredients to a solution or dispersion of the polymer. The solubility of the present compounds in a wide variety of organic solvents facilitates their use in solution and also renders them compatible with most oils and lubricants.

The hexahydro-1,3,5-tris-(4-hydroxyaryl)-s-triazines are compatible with conventional compounding ingredients such as processing oils, plasticizers lubricants, antisticking agents, fillers, reinforcing agents, sulfur and other curing agents, accelerators, anti-foaming agents, rust inhibitors and the like. They are also compatible with other known antioxidants, antiozonants, color and heat stabilizers, ultraviolet absorbers and the like and when employed in combination with certain of these stabilizers a synergistic effect will be produced. Synergism results, for example, when the hexahydro-1,3,5-tris-(4-hydroxyaryl)-s-triazines are combined with peroxide decomposing compounds such as dithiocarbamates, zinc dialkylthiophosphates or organic sulfides such as those described in U.S. Pat. 2,519,755. An especially marked synergistic effect is obtained when the compounds of the present invention are combined with diesters of β-thiodipropionic acid having the formula ROOCCH$_2$CH$_2$—S—CH$_2$CH$_2$COOR wherein R is an alkyl group containing from 6 to 20 carbon atoms such as octyl, decyl lauryl, cetyl, stearyl, palmityl, benzyl, cyclohexyl and the like. Typically, the amount β-dialkylthiodipropionate employed will be varied between about 1 part and 5 parts per part of the hexahydro-1,3,5-tris-(4-hydroxyaryl)-s-triazine in order to achieve optimum synergistic activity. Other useful stabilizer compositions possessing synergistic activity are obtained when the hexahydro-1,3,5-tris-(4-hydroxyaryl)-s-triazines are combined with other phenolic compounds, which are well known to the art, such as 2,6-di-t-butyl-4-methylphenol, tetra[methylene-3-(3,5-di-t-butyl-4 - hydroxyphenyl)propionate]methane, 1,3,5trimethyl-2,4,6-tris-(3,5-di-t-butyl-4-hydroxybenzyl)benzene, octadecyl-3-(3,5-di-t-butyl-4-hydroxyphenyl) propionate, tris-(3,5-di-t-butyl - 4 - hydroxyphenyl)phosphate, 4,4' - thiobis-(3-methyl-6-t-butylphenol) and the like.

The following examples illustrates the invention more fully. In these examples all parts and percentages are given on a weight basis unless otherwise indicated.

Example I

A glass reactor equipped with a stirrer, condenser and dropping funnel was charged with 21.6 grams (0.4 mol) powdered sodium methoxide and 785 grams of N,N-dimethylformamide which had been previously dried and distilled over calcium hydride. To this suspension was added 453.2 grams (2.2 mols) of redistilled 2,6-di-t-butylphenol and the resulting reaction mixture heated with stirring and under a nitrogen blanket to distill off methanol. The distillation was terminated when the distillate temperature reached 149° C. The reaction mixture was then allowed to cool to room temperature and 116 grams (0.666 mol) 1,3,5-triacryl-perhydro-s-triazine dissolved in 785 grams of N,N-dimethylformamide containing about 2 grams of 2,6-di-t-butyl-p-cresol added. The resulting reaction mixture was then heated at 135° C. for 3 hours maintaining the nitrogen blanket. 80 grams of 1:1 hydrochloric acid was then charged to the cooled reaction mixture. The sodium chloride formed was removed from the reaction mixture by filtration and 10.9 grams of sodium hydrosulfite added to the resulting filtrate. The N,N-dimethylformamide was then partially removed under vacuum and the resulting mass heated to approximately 80° C. and 154 grams of distilled water added with rapid stirring. This mixture was allowed to cool to 20° C. with continuous stirring. The resulting cream colored solid was collected by filtration and washed successively with 10% aqueous ethanol and 70% aqueous ethanol. The white crystalline solid obtained upon recrystallization from chloroform-hexane melted at 237–239° C. on a melting block. A sample nine times recrystallized from chloroform-hexane had a melting point, determined in a capillary, of 228–229° C. (uncorrected). Elemental analysis of this product agreed with the calculated values for hexahydro-1,3,5-tris-β-(3,5-di-t-butyl-4 - hydroxyphenyl)propionyl-s-triazine. Analysis of the compound by infrared and nuclear magnetic resonance spectroscopy confirmed the compound to be hexahydro-1,3,5-tris-β-(3,5-di-t-butyl-4-hydroxyphenyl)propionyl-s-triazine. Hexahydro-1,3,5-tris-β-(3,5-di-t-amyl-4-hydroxyphenyl)propionyl-s-triazine was also prepared using the above-described procedure.

Example II

A polymer blend of 75 parts polyvinyl chloride having a density of 1.56 and 25 parts of a methyl methacrylate-butadiene-styrene polymer compounded with three parts of a tin stabilizer, 5 parts titanium dioxide and 0.5 part of a lubricant was milled 4 minutes at 390° F. and then aged in a 400° F. forced-air oven. After aging for about 30 to 40 minutes, significant color change was noted in the above composition. After 50 to 60 minutes copious amounts of HCl was evolved. When 1 part hexahydro - 1,3,5 - tris-β-(3,5-di-t-butyl-4-hydroxyphenyl)propionyl-s-triazine, as prepared in Example I, was incorporated as additional stabilizer and the sample tested under identical test conditions, significant color change of the sample did not develop until after 90 minutes. Similarly, no gas evolution was apparent even after 120 minutes aging.

Example III

A conventional high density polyethylene stabilized with 0.1 part hexahydro-1,3,5-tris-β-(3,5 - di-t-butyl-4-hydroxyphenyl)propionyl-s-triazine was compared with polyethylene stabilized with several commercially available stabilizers and an unstabilized control. The recipes employed in these runs are set forth in Table I with test results. The samples were tested for oxygen absorption at 140° C.

TABLE I

| Sample | 1 | 2 | 3 | 4 |
|---|---|---|---|---|
| High density polyethylene | 100 | 100 | 100 | 100 |
| Hexahydro-1,3,5-tris-β-(3,5-di-t-butyl-4-hydroxy phenyl)-s-triazine | | 0.1 | | |
| 1,3,5-trimethyl-2,4,6-tris-(3,5-di-t-butyl-4-hydroxy benzyl)benzene | | | 0.1 | |
| Octadecyl-3-(3,5-di-t-butyl-4-hydroxyphenyl) propionate | | | | 0.1 |
| Induction time (hours) | 0.5 | 135 | 110 | 80 |

The additives were incorporated into the polyethylene by dissolving them in acetone, suspending the polyethylene therein, and then removing the acetone under vacuum. The stabilized polyethylene was hot milled (290–300° F.) for 5 minutes, sheeted off, placed in a 4-cavity ACS mold shimmed to the desired thickness and heated at 300° F. for 10 minutes, the last 5 minutes of which 150 tons pressure was applied. The samples were cooled while maintaining this pressure.

The oxygen absorption was determined on 10 mil molded samples which were pressed on aluminum screens and aged in pure oxygen at 140° C. in a modified Scott tester block. The induction period, that is, the time required for autooxidation of the polyethylene to occur, was recorded.

Similar improved stabilities were achieved when hexahydro - 1,3,5 - tris-β-(3,5 - di-t-amyl-4-hydroxyphenyl) propionyl-s-triazine was incorporated in polyethylene.

Example IV

Hexahydro-1,3,5-tris-β-(3,5 - di-t-butyl - 4 - hydroxyphenyl)propionyl-s-triazine was incorporated in polypropylene by itself and in combination with β-dialkylthiodipropionates in the same manner as employed in Example III. The recipes are set forth below in Table II. Samples were prepared by molding the stabilized polymer at 400° F. and 4000 p.s.i. for two minutes. The samples were then transferred to a cold press maintained at 4000 p.s.i. for a two minute cooling period. 25 mil samples were aged in an air-circulating oven at 140° C. The polypropylene samples were deemed to have failed at the first signs of crazing. Test results are also tabulated in Table II.

TABLE II

| Sample | 5 | 6 | 7 | 8 | 9 | 10 | 11 | 12 | 13 |
|---|---|---|---|---|---|---|---|---|---|
| Polypropylene | 100 | 100 | 100 | 100 | 100 | 100 | 100 | 100 | 100 |
| Parts hexahydro-1,3,5-tris-β-(3,5-di-t-butyl-4-hydroxyphenyl)-s-triazine | | 0.1 | 0.25 | 0.5 | 0.25 | 0.5 | 0.1 | 0.25 | 0.5 |
| Parts β-dilaurylthiodipropionate | | | | | 0.2 | 1.0 | | | |
| Parts β-distearylthiodipropionate | | | | | | | 0.25 | 0.25 | 0.25 |
| Hours to crazing | 1 | 960 | 1,500 | 1,728 | 2,322 | 3,498 | 1,720 | 2,148 | 2,232 |

Example V

To demonstrate the ability of the hexahydro-1,3,5-tris-β-(3,5-di-t-butyl-4-hydroxyphenyl)-s-triazine to stabilize polypropylene against the deleterious effects of ultraviolet light, samples 5-8 and 11–13 of Example IV were exposed in a Xenon dry-cycle weatherometer maintained at 90–100° C. The samples were rotated to insure identical exposure for all samples and observed at regular intervals. Results of this test are set forth in Table III.

TABLE III

| Sample: | Hours to failure [1] |
|---|---|
| 5 | 50 |
| 6 | 200 |
| 7 | 200 |
| 8 | 200 |
| 11 | 300 |
| 12 | 300 |
| 13 | 400 |

[1] The first color development and embrittlement is noted.

Example VI

A natural rubber white stock was prepared in accordance with the following recipe:

| Ingredient | Parts | |
|---|---|---|
| | Sample 14 | Sample 15 |
| Natural rubber | 100 | 100 |
| Zinc oxide | 85 | 85 |
| Titanium dioxide | 15 | 15 |
| Ultramarine blue | 0.2 | 0.2 |
| Stearic acid | 2.0 | 2.0 |
| Sulfur | 3 | 3 |
| Benzothiazyl disulfide | 1.0 | 1.0 |
| Hexahydro-1,3,5-tris-β-(3,5-di-t-butyl-4-hydroxyphenyl)propionyl-s-triazine | 1.0 | |

The samples were cured at 284° F. for the time required to develop optimum cure (as determined with a viscurometer). These samples were then aged for 72 hours in oxygen bombs maintained at 70° C. Physical properties (unaged and aged) for the control and stabilized samples are set forth in Table IV.

TABLE IV

| Sample | 14 | 15 |
|---|---|---|
| Original properties: | | |
| 300% modulus (p.s.i.) | 400 | 410 |
| Tensile strength (p.s.i.) | 3,300 | 3,460 |
| Elongation (percent) | 725 | 730 |
| Properties after aging: | | |
| 300% modulus (p.s.i.) | 540 | |
| Tensile strength (p.s.i.) | 770 | 400 |
| Elongation (percent) | 390 | 220 |

Example VII

One hundred parts ethylene-propylene terpolymer (53% ethylene, 43% propylene, 4% ethylidene norbornene) was masterbatched with 75 parts PEF black and 25 parts naphthenic oil and compounded as follows:

| Ingredients: | Parts |
|---|---|
| Masterbatch | 200 |
| Zinc oxide | 5 |
| Stearic acid | 1.0 |
| Sulfur | 1.5 |
| Mercaptobenzothiazole | 1.5 |
| Tetramethylthiuram disulfide | 0.8 |
| Dipentamethylene thiuram tetrasulfide | 0.8 |
| Hexahydro - 1,3,5 - tris-β-(3,5-di-t-butyl-4-hydroxyphenyl)propionyl-s-triazine | 1.0 |

Samples were air aged at 150°, and tensile properties of the rubber determined at 7 day intervals. The stability of the polymer is evident from the tabulation of the test results in Table V.

TABLE V

| | Aging time (days) | | | |
|---|---|---|---|---|
| | 0 | 7 | 14 | 21 |
| Ultimate tensile strength (p.s.i.) | 2,050 | 2,075 | 2,000 | 1,950 |
| Percent tensile retained | | 101 | 98 | 95 |

Example VIII

Unstabilized ethylene-propylene-methyl tetrahydroindene (52%/44%/4%) terpolymer containing 10 parts per million vanadium catalyst residue became sticky (degraded) after less than 1 day air-aging at 125° C. When 0.1 part hexahydro-1,3,5-tris-β-(3,5-di-t-butyl-4-hydroxyphenyl)propionyl-s-triazine was employed to stabilize the rubber, the first manifestations of stickiness were not evident until after 22 days of aging.

Example IX

The following compositions were stabilized with varying amounts of hexahydro-1,3,5-tris-β-(3,5-di-t-butyl-4-hydroxyphenyl)propionyl-s-triazine as follows:

| Sample | Material | Stabilizer (parts) |
|---|---|---|
| 16 | ABS resin | 0.5 |
| 17 | Polystyrene | 0.5 |
| 18 | Nylon 6 | 0.5 |
| 19 | Ethyl acrylate plus acrylonitrile copolymer (70%/30%) | 0.5 |
| 20 | Cyclohexene | 0.001 |
| 21 | Mineral oil | 0.1 |
| 22 | Synthetic lubricant | 1.5 |
| 23 | Polyethylene terephthalate resin | 0.5 |
| 24 | Polyoxymethylene | 0.5 |
| 25 | Acetal copolymer resin | 0.5 |

TABLE VII

| Sample | 28 | 29 | 30 | 31 | 32 | 33 | 34 | 35 | 36 | 37 | 38 | 39 |
|---|---|---|---|---|---|---|---|---|---|---|---|---|
| Foam composition: | | | | | | | | | | | | |
| Natural rubber | 20 | 20 | 20 | 9 | 9 | 9 | 100 | 100 | 100 | | | |
| Polybutadiene rubber | | | | 91 | 91 | 91 | | | | 100 | 100 | 100 |
| Styrene-butadiene rubber | 80 | 80 | 80 | | | | | | | | | |
| Polystyrene (parts) | 5 | 5 | 5 | 14.4 | 14.4 | 14.4 | | | | | | |
| Feldspar (parts) | | | | 50 | 50 | 50 | | | | | | |
| Hexahydro-1,3,5-tris-β-(3,5-di-t-butyl-4-hydroxyphenyl) propionyl-s-triazine (parts) | | 2.5 | 5 | | 2.5 | 5 | | 2.5 | 5 | | 2.5 | 5 |
| Original compression modulus (grams/in.²) | 250 | 250 | 260 | 225 | 150 | 190 | 255 | 250 | 260 | 375 | 360 | 350 |
| Percent change compression modulus after 72 hours | +111 | +15.4 | +8 | +595 | +147 | +105 | +850 | +100 | +61.5 | +173 | +25.6 | +25.7 |

All of the compositions (16–25) set forth above had improved oxidative stability over the unstabilized materials.

Example X

An ethyl acrylate-acrylonitrile (70%/30%) stabilized with 0.5 part per hundred part rubber hexahydro-1,3,5-tris - β-(3,5-di-t-butyl-4-hydroxyphenyl)propionyl-s-triazine was used to saturate 11 mil uncoated bleached craft paper by immersing the paper in the latex (15% total solids) for 20 seconds and then allowing the paper to drip dry at room temperature. The paper was aged at 138° C. After 7 days aging the paper saturated with the stabilized latex had superior brightness (as determined by light reflectance) compared with a paper saturated with an unstabilized control latex.

Example XI

One part hexahydro-1,3,5-tris-β-(3,5-di-t-butyl-4-hydroxyphenyl)propionyl-s-triazine was employed to stabilize an elastomeric polyurethane (Estane 5740X140) containing 0.5 part of a commercially available stabilizer (Tinuvin P). This sample (26) and an unstabilized control (sample 27) were air-aged for one week at 120° C. Test results are tabulated in Table VI.

TABLE VI

| Sample | 26 | 27 |
|---|---|---|
| Original properties: | | |
| Tensile strength (p.s.i.) | 4,600 | 4,420 |
| Elongation (percent) | 650 | 640 |
| 300% modulus (p.s.i.) | 1,080 | 1,100 |
| Percent change in properties after aging: | | |
| Tensile strength (p.s.i.) | −66 | −90 |
| Elongation (percent) | +8 | −53 |
| 300% modulus (p.s.i.) | −19 | −60 |

Example XII

Several foam samples were stabilized with hexahydro-1,3,5 - tris-β-(3,5-di-t-butyl-4-hydroxyphenyl)propionyl-s-triazine and aged at 25° C. in an air atmosphere containing 100 parts per million nitrogen dioxide. The foam compositions are set forth in Table VII. They were conventionally cured and the compression modulus determined. The percent change in the compression modulus reported in Table VII represents a measure of the softening (−) or hardening (+) of the foams during aging.

I claim:

1. A stabilized composition of matter which comprises an organic material and from about 0.001% to about 10% by weight of a hexahydro-1,3,5-(4-hydroxyaryl)-s-triazine of the formula

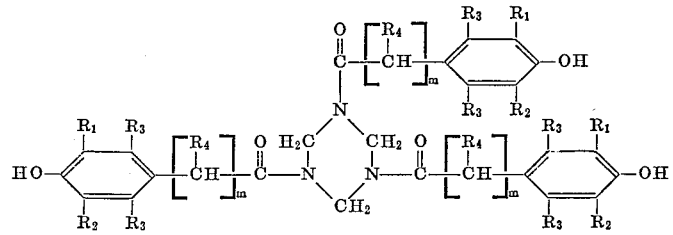

wherein $R_1$ and $R_2$ are tertiary alkyl groups containing from 4 to 18 carbon atoms, $R_3$ is a radical selected from the group consisting of hydrogen or alkyl containing from 1 to 18 carbon atoms, $R^4$ is a radical selected from the group consisting of hydrogen or alkyl containing from 1 to 4 carbon atoms and $m$ is an integer from 2 to 5.

2. The stabilized composition of matter of claim 1 wherein the hexahydro-1,3,5-tris-(4-hydroxyaryl)-s-triazine has the formula

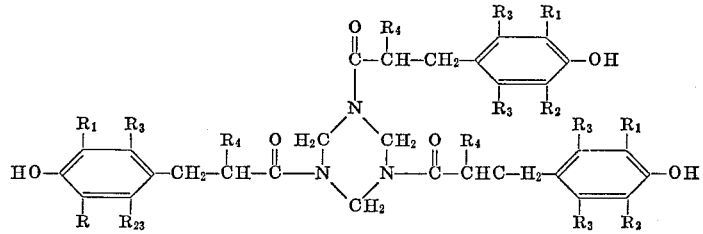

wherein $R_4$ is a radical selected from the group consisting of hydrogen or methyl.

3. The stabilized composition of matter of claim 2 wherein the organic material is selected from the group consisting of α-monoolefin homopolymers, α-monoolefin copolymers, acetal homopolymers, acetal copolymers, polyamides having recurring amide groups as integral parts of the main polymer chain, polyesters and polyurethanes.

4. The stabilized composition of matter of claim 2 wherein $R_1$ and $R_2$ of the hexahydro-1,3,5-tris-(4-hydroxyaryl)-s-triazine are tertiary alkyl groups containing from 4 to 12 carbon atoms, $R_3$ is hydrogen and the organic material is selected from the group consisting of α-monoolefin homopolymers, α - monoolefin copolymers, acetal homopolymers, acetal copolymers, polyamides having recurring amide groups as integral parts of the main polymer chain, polyesters and polyurethanes.

5. The stabilized composition of matter of claim 4 wherein the hexahydro-1,3,5-tris-(4-hydroxyaryl)-s-triazine is employed in amount between about 0.01% to about 5% by weight and is hexahydro-1,3,5-tris-β-(3,5-di-t-butyl-4-hydroxyphenyl)propionyl-s-triazine.

6. The stabilized composition of matter of claim 4 wherein the hexahydro-1,3,5-tris-(4-hydroxyaryl)-s-triazine is employed in amount between about 0.01% to about 5% by weight and is hexahydro-1,3,5-tris-β-(3,5-di-t-amyl-4-hydroxyphenyl)propionyl-s-triazine.

7. The stabilized composition of matter of claim 4 wherein the hexahydro-1,3,5-tris-(4-hydroxyaryl)-s-triazine is employed in amount between about 0.01% to about 5% by weight and is hexahydro-1,3,5-tris-β-(3,5-di-t-butyl-4-hydroxyphenyl)-α-methylpropionyl-s-triazine.

8. The stabilized composition of matter of claim 4 wherein the hexahydro-1,3,5-tris-(4-hydroxyaryl)-s-triazine is employed in amount between about 0.01% to about 5% by weight and is hexahydro-1,3,5-tris-β-(3,5-di-t-amyl-4-hydroxyphenyl)-α-methylpropionyl-s-triazine.

9. A stabilized composition of matter which comprises (a) an α-monoolefin homopolymer or copolymer; (b) about 0.01% to about 5% by weight of a hexahydro-1,3,5-tris-(4-hydroxyaryl)-s-triazine of the formula

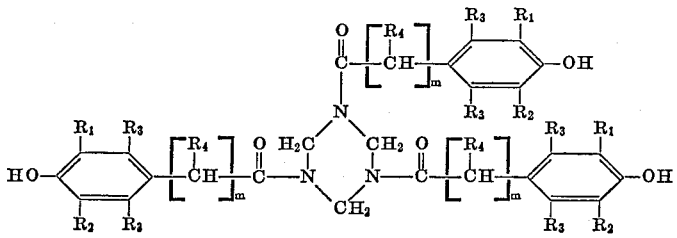

wherein $R_1$ and $R_2$ are tertiary alkyl groups containing from 4 to 18 carbon atoms, $R_3$ is a radical selected from the group consisting of hydrogen or alkyl containing from 1 to 18 carbon atoms, $R_4$ is a radical selected from the group consisting of hydrogen or alkyl containing from 1 to 4 carbon atoms and $m$ is an integer from 2 to 5; and (c) from about 1 part to about 5 parts per part of the hexahydro-1,3,5-tris-(4-hydroxyaryl)-s-triazine of a compound selected from the group consisting of a phenolic antioxidant and β-dialkylthiodipropionate of the formula $ROOCCH_2CH_2$—S—$CH_2CH_2COOR$ wherein R is an alkyl group containing from 6 to 20 carbon atoms.

10. The stabilized composition of matter of claim 9 wherein the hexahydro-1,3,5-tris-(4-hydroxyaryl)-s-triazine has the formula

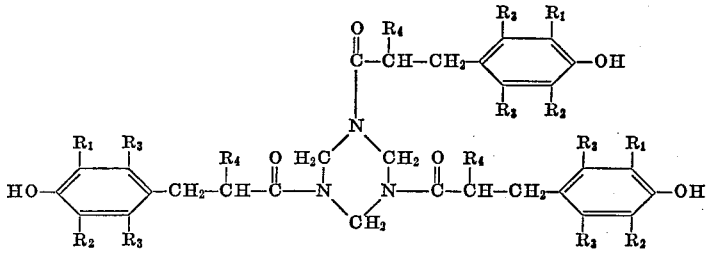

wherein $R_1$ and $R_2$ are tertiary alkyl groups containing from 4 to 12 carbon atoms, $R_3$ is hydrogen and $R_4$ is a radical selected from the group consisting of hydrogen or methyl.

11. The stabilized composition of matter of claim 10 wherein the β-dialkylthiodipropionate is β-dilaurylthiodipropionate or β-distearylthiodipropionate.

12. The stabilized composition of matter of claim 11 wherein the α-monoolefin polymer is polyethylene.

13. The stabilized composition of matter of claim 11 wherein the α-monoolefin polymer is polypropylene.

References Cited
UNITED STATES PATENTS

| | | | |
|---|---|---|---|
| 3,282,939 | 11/1966 | Spivack et al. | 260—247.7 |
| 3,530,127 | 9/1970 | Biland | 260—248 |
| 3,531,483 | 9/1970 | Gilles | 260—248 |
| 3,567,724 | 3/1971 | Beears | 260—248 |
| 3,584,047 | 6/1971 | Dexter et al. | 260—559 |

DONALD E. CZAJA, Primary Examiner

R. A. WHITE, Assistant Examiner

U.S. Cl. X.R.

44—63; 252—51.5 R; 260—45.85, 45.95, 398.5

UNITED STATES PATENT OFFICE
CERTIFICATE OF CORRECTION

Patent No. 3,639,336          Dated February 1, 1972

Inventor(s) Warren L. Beears

It is certified that error appears in the above-identified patent and that said Letters Patent are hereby corrected as shown below:

Column 10, lines 49-59, Claim 2, the formula should read

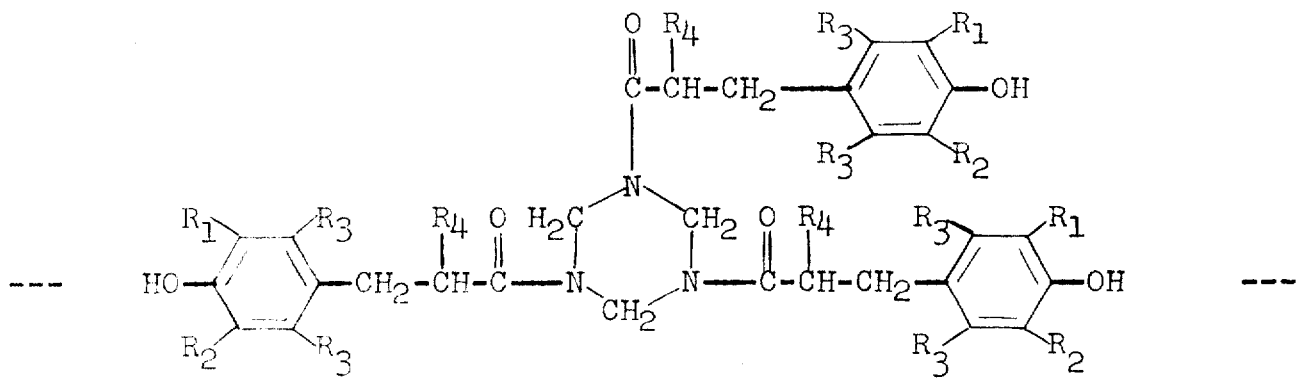

Signed and sealed this 20th day of February 1973.

(SEAL)
Attest:

EDWARD M. FLETCHER, JR.
Attesting Officer

ROBERT GOTTSCHALK
Commissioner of Patents